(12) United States Patent
Honma et al.

(10) Patent No.: US 8,145,122 B2
(45) Date of Patent: Mar. 27, 2012

(54) POWER SUPPLY ADAPTER AND POWER SUPPLY SYSTEM

(75) Inventors: Katsunori Honma, Tokyo (JP); Rikiya Ishikawa, Kanagawa (JP); Kosuke Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 633 days.

(21) Appl. No.: 12/336,700

(22) Filed: Dec. 17, 2008

(65) Prior Publication Data

US 2009/0176472 A1    Jul. 9, 2009

(30) Foreign Application Priority Data

Jan. 7, 2008    (JP) .................................. 2008-000500

(51) Int. Cl.
*H04H 20/71* (2008.01)
(52) U.S. Cl. ...................................... 455/3.01; 455/3.02
(58) Field of Classification Search .................. 455/3.02, 455/270, 298, 343.1, 3.01
See application file for complete search history.

(56) References Cited

U.S. PATENT DOCUMENTS

| 4,885,795 | A  | * | 12/1989 | Bunting et al. | 725/78  |
| 7,212,921 | B2 | * | 5/2007  | Jeerage et     | 701/214 |
| 7,433,343 | B1 | * | 10/2008 | Smith          | 370/338 |
| 7,633,998 | B2 | * | 12/2009 | Dockemeyer et al. | 375/220 |

FOREIGN PATENT DOCUMENTS

JP    7-128426    5/1995

* cited by examiner

*Primary Examiner* — Brian Young
(74) *Attorney, Agent, or Firm* — Oblon, Spivak, McClelland, Maier & Neustadt, L.L.P.

(57) ABSTRACT

Disclosed herein is a power supply adapter for supplying DC power to a broadcast receiver that processes a broadcast signal. The power supply adapter includes: a converter configured to generate the DC power from AC power; a broadcast signal reception section configured to receive the broadcast signal; a mixer configured to mix the broadcast signal received by the broadcast signal reception section with an output from the converter; and a supply section configured to supply an output from the mixer to the broadcast receiver.

5 Claims, 4 Drawing Sheets

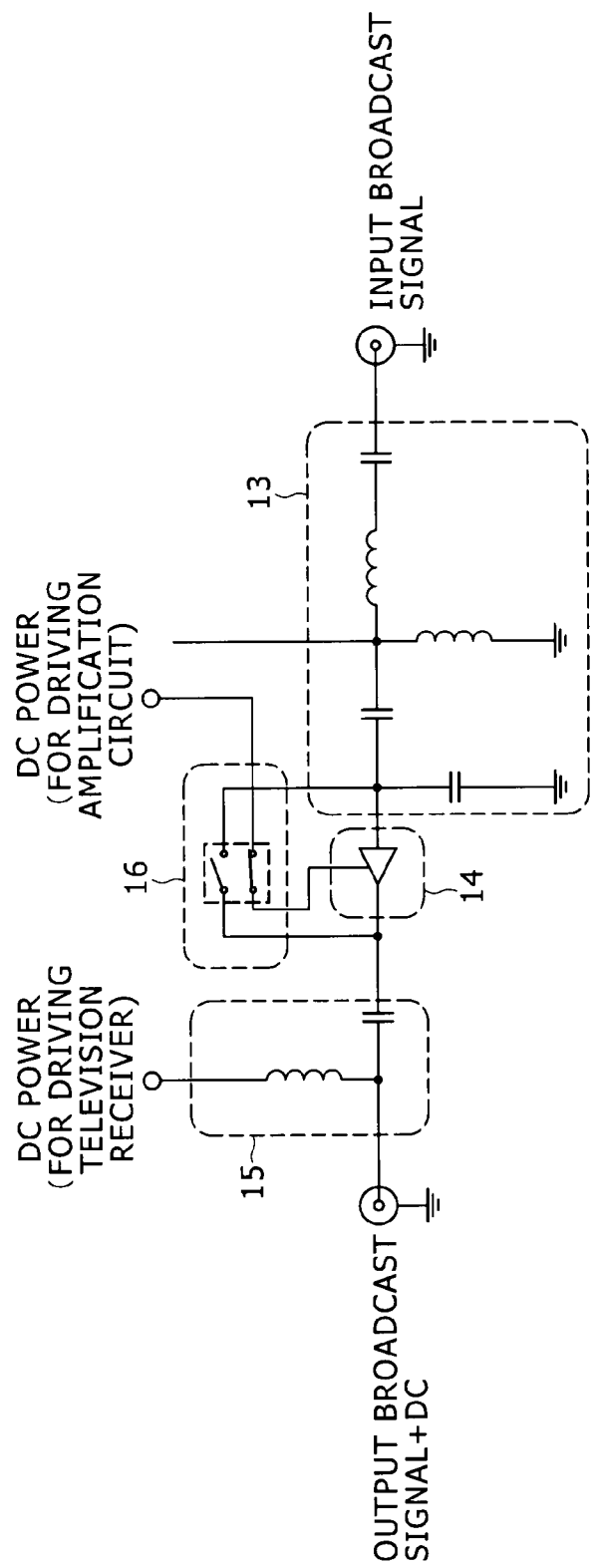
F I G . 2

POWER SUPPLY ADAPTER AND POWER SUPPLY SYSTEM

CROSS REFERENCES TO RELATED APPLICATIONS

The present invention contains subject matter related to Japanese Patent Application JP 2008-000500, filed in the Japan Patent Office on Jan. 7, 2008, the entire contents of which being incorporated herein by reference.

BACKGROUND OF THE INVENTION

1. Field of the Invention

The present invention relates to a power supply adapter and a power supply system for supplying power to a broadcast receiver such as a television receiver.

2. Description of the Related Art

Common broadcast receivers, such as common television receivers, especially small broadcast receivers, are driven by receiving DC power as supplied from a power supply adapter via a cable, and receive a broadcast signal as supplied from an outdoor antenna via a coaxial cable. Such common broadcast receivers have design constraints, e.g., difficulty in miniaturization, because of the need to secure space for an inlet, which is a connection section for receiving the power as supplied from the power supply adapter via the cable, and a connector, which is a connection section for receiving the broadcast signal as supplied from the outdoor antenna via the coaxial cable. In addition, it is not desirable in terms of visual appearance and for safety reasons that a plurality of cables, such as the power supply cable and the antenna coaxial cable, lie around the broadcast receiver. Moreover, that produces a constraint that limits locations where the broadcast receiver can be installed.

There have already been proposed techniques for allowing both the power supply and the transmission of the broadcast signal to be achieved with use of a single cable. According to one such technique, for example, both supply of the DC power from the broadcast receiver, such as the television receiver, to a satellite broadcast antenna, which requires the power supply, and input of the broadcast signal from the satellite broadcast antenna into the broadcast receiver are achieved with use of a single coaxial cable. That is, the broadcast receiver supplies the DC power to the satellite broadcast antenna via the transmission cable, while the satellite broadcast antenna supplies the broadcast signal to the broadcast receiver via the same transmission cable (see Japanese Patent Laid-open No. Hei 7-128426).

In the above known technique, both the supply of the DC power from the broadcast receiver to the antenna and the supply of the broadcast signal from the antenna to the broadcast receiver are achieved with the use of the single transmission cable, which connects the broadcast receiver and the antenna. This technique is applicable only when the antenna that requires the supply of the DC power from the broadcast receiver is used.

SUMMARY OF THE INVENTION

As described above, the common broadcast receivers, such as the common television receivers, have the design constraints, e.g., difficulty in miniaturization, because of the need to secure the space for the inlet, which is the connection section for receiving the power as supplied from the power supply adapter via the cable, and the connector, which is the connection section for receiving the broadcast signal as supplied from the outdoor antenna via the coaxial cable. In addition, it is not desirable in terms of visual appearance and for safety reasons that the two cables, i.e., the power supply cable and the antenna coaxial cable, lie around the broadcast receiver.

The present invention addresses the above-identified, and other problems associated with methods and apparatuses in related art, and provides a power supply adapter and a power supply system that allow the DC power and the broadcast signal to be supplied to the broadcast receiver via a single cable.

According to one embodiment of the present invention, there is provided a power supply adapter for supplying DC power to a broadcast receiver that processes a broadcast signal, the power supply adapter including: a converter configured to generate the DC power from AC power; a broadcast signal reception section configured to receive the broadcast signal; a mixer configured to mix the broadcast signal received by the broadcast signal reception section with an output from the converter; and a supply section configured to supply an output from the mixer to the broadcast receiver.

According to this embodiment of the present invention, the broadcast signal received by the broadcast signal reception section is mixed with the DC power generated by the converter from the AC power, and a mixture of the DC power and the broadcast signal is supplied to the broadcast receiver. Thus, the DC power and the broadcast signal can be supplied to an external device (i.e., the broadcast receiver) using a single cable. This eliminates the need to provide the broadcast receiver with a connection section for an antenna or a connection section for DC power supply, resulting in a reduction in product design constraints of the broadcast receiver. Moreover, because of a reduction in the number of cables connected to the broadcast receiver, complexity in appearance of surroundings of the broadcast receiver can be reduced, and constraints on selecting a location where the broadcast receiver is installed can be relaxed.

According to another embodiment of the present invention, there is provided a power supply system including: a broadcast receiver configured to process a broadcast signal; and a power supply adapter configured to supply DC power to the broadcast receiver. The power supply adapter includes: a converter configured to generate the DC power from AC power; a broadcast signal reception section configured to receive the broadcast signal; a mixer configured to mix the broadcast signal received by the broadcast signal reception section with an output from the converter; and a supply section configured to supply an output from the mixer to the broadcast receiver. The broadcast receiver includes a splitting section configured to separate the DC power and the broadcast signal from an output from the power supply adapter.

The present invention enables the DC power and the broadcast signal to be supplied to the broadcast receiver using a single cable. This eliminates the need to provide the broadcast receiver with the connection section for the antenna or the connection section for the DC power supply, resulting in a reduction in product design constraints of the broadcast receiver. Moreover, because of the reduction in the number of cables connected to the broadcast receiver, the complexity in the appearance of the surroundings of the broadcast receiver can be reduced, and the constraints on selecting the location where the broadcast receiver is installed can be relaxed.

BRIEF DESCRIPTION OF THE DRAWINGS

FIG. 2 illustrates exemplary specific circuit structures of an input filter, a switch circuit, an amplification circuit, and a mixer within a power supply adapter as shown in FIG. 1;

DETAILED DESCRIPTION OF THE PREFERRED EMBODIMENTS

Hereinafter, preferred embodiments of the present invention will be described with reference to the accompanying drawings.

First Embodiment

Figure 1:
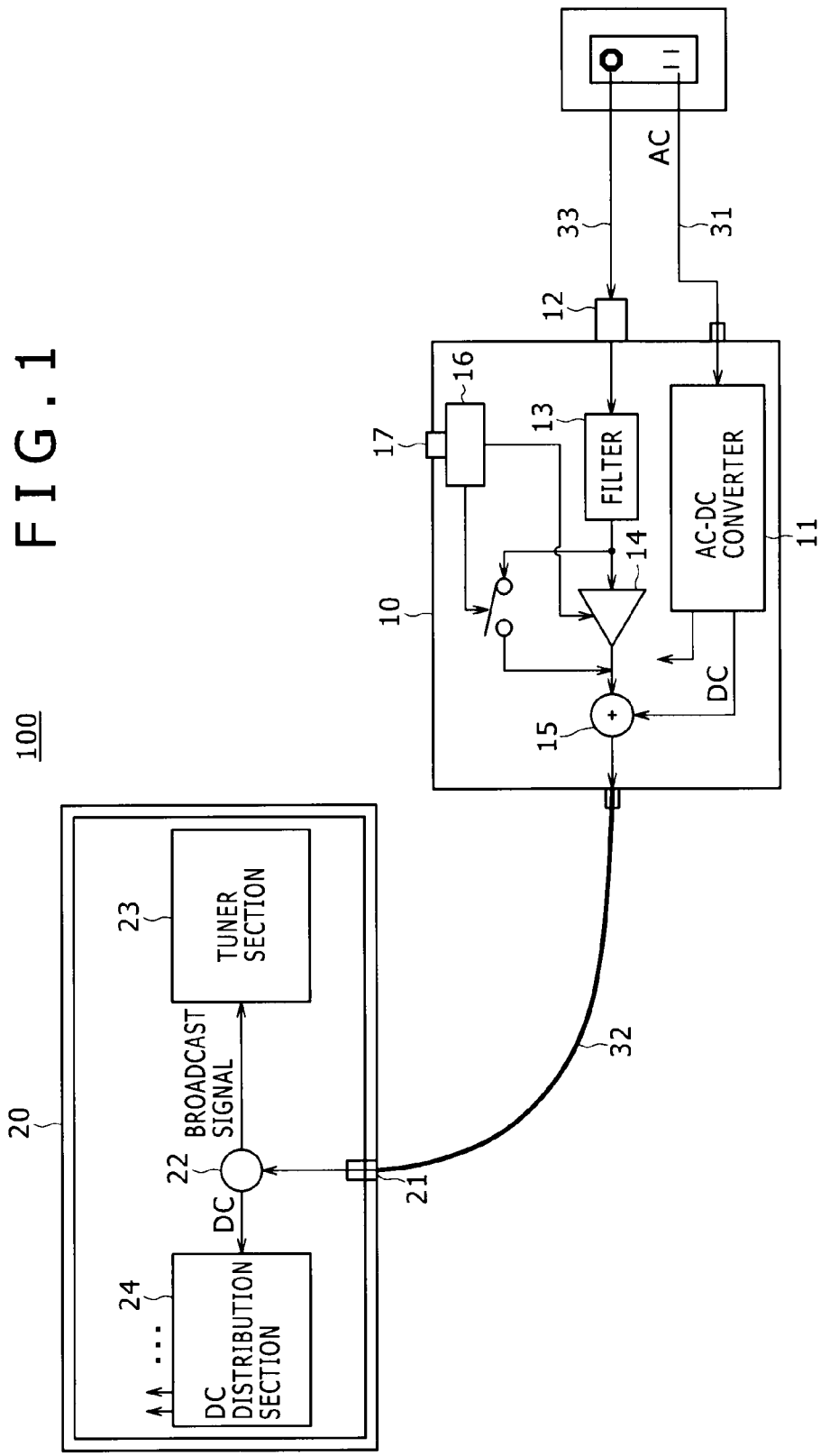
FIG. 1 illustrates the structure of a power supply system according to a first embodiment of the present invention.

FIG. 1 illustrates the structure of a power supply system 100 according to a first embodiment of the present invention.

As shown in FIG. 1, the power supply system 100 includes a power supply adapter 10 and a television receiver 20. The power supply adapter 10 generates, from commercial AC power, DC (Direct Current) power required for operation of the television receiver 20, superimposes a broadcast signal (a radio frequency (RF) signal or an intermediate frequency (IF) signal) received by an outdoor antenna upon the DC power, and supplies a resultant mixture to the television receiver 20. Examples of the broadcast signal include a terrestrial broadcast signal and a satellite broadcast signal. The television receiver 20 separates the mixture of the DC power and the broadcast signal as supplied from the power supply adapter 10 into the DC power and the broadcast signal for use thereof.

The structure of the power supply adapter 10 will now be described below.

The power supply adapter 10 includes an AC (Alternating Current) power supply cable 31, an AC-DC converter circuit 11, a coaxial cable connector 12, an input filter 13, an amplification circuit 14, a mixer 15, a switch circuit 16, a switch operation section 17, and a DC supply cable 32.

The AC power supply cable 31 has a power plug at one end thereof, and connects a commercial AC power supply to an input terminal of the AC-DC converter circuit 11 within the power supply adapter 10 via the power plug.

The AC-DC converter circuit 11 is a circuit for generating specified DC power from the commercial AC power supply connected thereto via the AC power supply cable 31. The AC-DC converter circuit 11 is similar in basic structure to an AC-DC converter circuit contained in a common power supply adapter. One difference is that the AC-DC converter circuit 11 outputs DC power required to drive the amplification circuit 14 within the power supply adapter 10, in addition to the DC power for driving the television receiver 20. An output of the AC-DC converter circuit 11 for the DC power for driving the television receiver 20 is connected to one of two input terminals of the mixer 15.

The coaxial cable connector 12 is a connector to which a connector provided at one end of a coaxial cable 33 is detachably connected. The other end of the coaxial cable 33 is connected to the outdoor antenna for receiving the broadcast signal, such as the terrestrial broadcast signal or the satellite broadcast signal. An internal terminal of the coaxial cable connector 12 is connected to an input terminal of the input filter 13.

The input filter 13 is, for example, a band-pass filter (BPF) for removing unnecessary band components from the broadcast signal inputted via the coaxial cable connector 12. An output terminal of the input filter 13 is connected to an input terminal of the amplification circuit 14.

The amplification circuit 14 is a circuit for amplifying the broadcast signal that has passed through the input filter 13. An output terminal of the amplification circuit 14 is connected to one of the two input terminals of the mixer 15, the other one of the two input terminals of the mixer 15 being connected to the output terminal of the AC-DC converter circuit 11. For example, an amplification circuit equipped with an automatic gain control (AGC) or the like may be used as the amplification circuit 14 in order to optimize output levels.

The switch circuit 16 is a circuit for switching on and off the amplification circuit 14. A switch between on and off states of the switch circuit 16 is achieved, for example, by a manual operation on the switch operation section 17, which is exposed above the exterior of a housing of the power supply adapter 10.

The mixer 15 is a circuit for superimposing the broadcast signal inputted thereto from the amplification circuit 14 upon the DC power inputted thereto from the AC-DC converter circuit 11. An output terminal of the mixer 15 is connected to one end of the DC supply cable 32, which is used to supply the DC power to the television receiver 20.

The DC supply cable 32 is a cable for supplying, to the television receiver 20, the DC power upon which the broadcast signal is superimposed. A shielded wire in which a power supply wire is shielded, a coaxial wire, or the like is used for the DC supply cable 32, so as to reduce influence of external noise and prevent the broadcast signal superimposed upon the DC power from causing unwanted field emission toward an outside.

FIG. 2 illustrates exemplary specific circuit structures of the input filter 13, the switch circuit 16, the amplification circuit 14, and the mixer 15.

As shown in FIG. 2, the input filter 13 can be formed by a resonant circuit that is composed of a combination of inductors and capacitors connected in series and parallel, for example. In this embodiment, the input filter 13 is constructed as the BPF that passes a certain frequency range and attenuates frequency ranges outside that frequency range. The switch circuit 16 is composed of a line that bypasses the amplification circuit 14 and a switch element for switching between on and off states of this bypass line and turning on and off the DC power to the amplification circuit 14. The switch element is switched on and off in accordance with the manual operation or the like on the switch operation section 17 as shown in FIG. 1, for example. While the bypass line is in the on state, the DC power to the amplification circuit 14 is off, so that the broadcast signal is not amplified thereby. Meanwhile, while the bypass line is in the off state, the DC power to the amplification circuit 14 is on, so that the broadcast signal is amplified thereby. The mixer 15 is constructed using an inductor and a capacitor, for example. The output terminal of the AC-DC converter circuit 11 is connected via the inductor to the terminal through which the mixture of the DC power and the broadcast signal is outputted, whereas the output terminal of the amplification circuit 14 is connected via the capacitor to the terminal through which the mixture of the DC power and the broadcast signal is outputted. This contributes to avoiding influence of unwanted AC components on the operation of the AC-DC converter circuit 11 and influence of unwanted DC components on the operation of the amplification circuit 14.

Returning to FIG. 1, the structure of a splitting section in the television receiver 20 will now be described below.

The television receiver 20 includes a DC inlet 21 and a splitter 22.

The DC inlet 21 is a part to which a connector of the DC supply cable 32 of the power supply adapter 10 is detachably connected. The DC inlet 21 is similar to a DC inlet provided in a common television receiver. An output terminal of the DC inlet 21 is connected to an input terminal of the splitter 22.

The splitter 22 is a circuit for separating the DC power and the broadcast signal from the DC power upon which the broadcast signal is superimposed. The DC power separated by the splitter 22 is supplied via a DC distribution section 24 to various modules within the television receiver 20, such as a circuit and a display, which operate on the DC power. The broadcast signal separated by the splitter 22 is supplied to a tuner section 23 within the television receiver 20.

Figure 3:
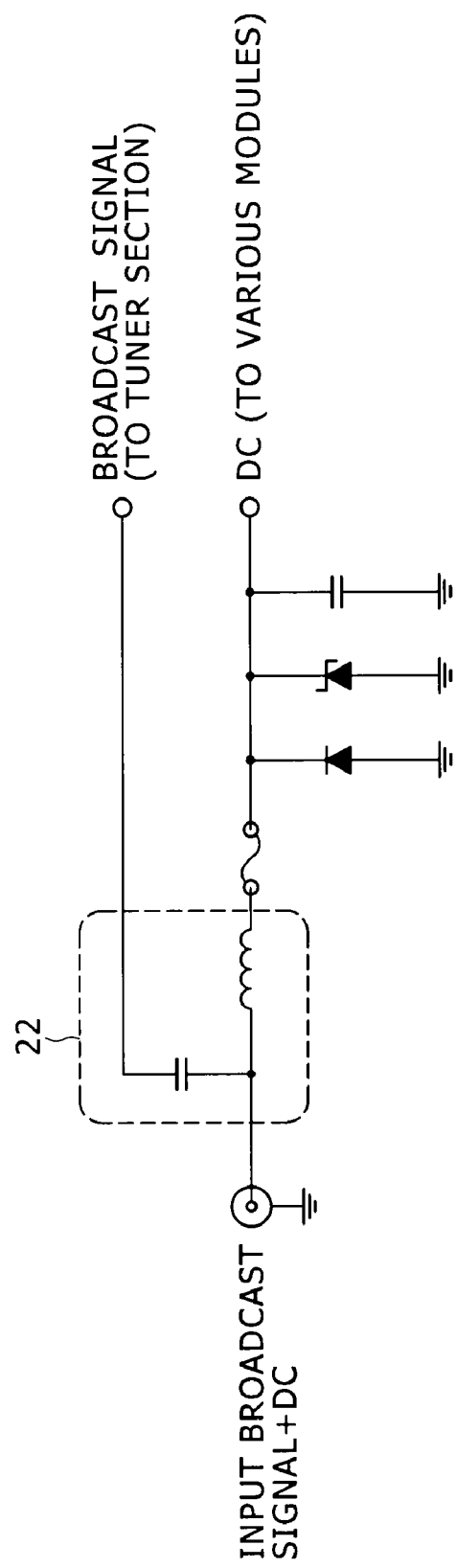
FIG. 3 illustrates an exemplary specific circuit structure of a splitter within a television receiver as shown in FIG. 1.

FIG. 3 illustrates an exemplary specific circuit structure of the splitter 22. As shown in FIG. 3, the splitter 22 is constructed using an inductor and a capacitor, for example. The tuner section 23, which is a broadcast signal processing circuit, is connected via the capacitor to the terminal through which the mixture of the DC power and the broadcast signal is inputted, whereas the DC distribution section 24, which distributes the DC power among the various modules, such as the circuit and the display, which operate on the DC power, is connected via the inductor to the terminal through which the mixture of the DC power and the broadcast signal is inputted. This contributes to avoiding influence of unwanted AC components on the operation of the various modules and influence of unwanted DC components on the operation of the tuner section 23.

The operation of the power supply system 100 will now be described below.

It is assumed here that the power supply adapter 10 is connected to the commercial AC power supply via the AC power supply cable 31 and is also connected to the television receiver 20 via the DC supply cable 32, and that the connector of the coaxial cable 33, which is connected to the outdoor antenna, is connected to the coaxial cable connector 12 of the power supply adapter 10.

In the power supply adapter 10 in the above situation, the AC-DC converter circuit 11 generates the specified DC power from the commercial AC power supplied via the AC power supply cable 31. At this time, the AC-DC converter circuit 11 generates the DC power for driving the television receiver 20 and the DC power for driving the amplification circuit 14 at the same time. The DC power generated for driving the television receiver 20 is applied to one of the two input terminals of the mixer 15, whereas the DC power generated for driving the amplification circuit 14 is applied to the switch circuit 16 for controlling the on and off of the operation of the amplification circuit 14.

In addition, the broadcast signal received by the outdoor antenna is inputted to the power supply adapter 10 via the coaxial cable connector 12. The broadcast signal inputted to the power supply adapter 10 via the coaxial cable connector 12 is inputted to the input filter 13, and then inputted to the amplification circuit 14 after the input filter 13 removes the unnecessary band components from the broadcast signal. The broadcast signal is amplified by the amplification circuit 14, and then inputted to one of the two input terminals of the mixer 15, the other one of the two input terminals of the mixer 15 being the input terminal to which the DC power is applied. As a result, the DC power upon which the broadcast signal is superimposed is obtained by the mixer 15 and supplied to the television receiver 20 via the DC supply cable 32.

Note that the above description assumes that the operation of the amplification circuit 14 is switched on by the switch circuit 16. When reception by the outdoor antenna of radio waves is poor, resulting in a reduction in quality of images displayed by the television receiver 20, for example, a user may perform the manual operation or the like on the switch operation section 17 to configure the switch circuit 16 to switch on the operation of the amplification circuit 14. Meanwhile, when the reception by the outdoor antenna of the radio waves is excellent, the user may perform the manual operation or the like on the switch operation section 17 to configure the switch circuit 16 to switch off the operation of the amplification circuit 14. This will contribute to preventing electric field intensity from increasing beyond the performance of the amplification circuit or the tuner, and also to preventing unnecessary power consumption.

In the television receiver 20, the DC power upon which the broadcast signal is superimposed as supplied thereto via the DC supply cable 32 is separated by the splitter 22 into the DC power and the broadcast signal. The separated DC power is supplied to the various modules (including the tuner section 23) within the television receiver 20, such as the circuit and the display, which operate on the DC power. Meanwhile, the separated broadcast signal is supplied to the tuner section 23. The tuner section 23 performs processes such as detection and demodulation of a broadcast signal corresponding to a channel selected by the user, and outputs a resultant signal to a signal processing circuit (not shown) in a subsequent stage. The signal processing circuit in the subsequent stage subjects the signal to processes such as separation of video and audio, decoding, D/A conversion, and/or the like, so that the video is displayed by the display and the audio is outputted via a loudspeaker.

As described above, in the power supply system 100 according to this embodiment, the broadcast signal received by the outdoor antenna is superimposed upon the DC power within the power supply adapter 10, and the mixture of the broadcast signal and the DC power is supplied to the television receiver 20 using the single DC supply cable 32. This eliminates the need to provide the television receiver 20 with an external antenna terminal, resulting in a reduction in product design constraints. Moreover, in the case of television receivers in related art, two cables, i.e., a power supply cable and a coaxial cable for the broadcast signal, are connected to the television receiver, which is likely to result in complicated appearance of surroundings of the television receiver. In contrast, in the case of the power supply system 100 according to this embodiment, only the power supply cable (i.e., the DC supply cable 32) needs to be connected to the television receiver 20, eliminating the complicated appearance.

Note that the broadcast signal that is superimposed upon the DC power and supplied to the television receiver 20 is not limited to the terrestrial broadcast signal, but may be the satellite broadcast signal, a terrestrial digital radio broadcast signal, or a CATV digital broadcast signal.

Second Embodiment

Next, a power supply system 200 according to a second embodiment of the present invention will now be described below.

Figure 4:
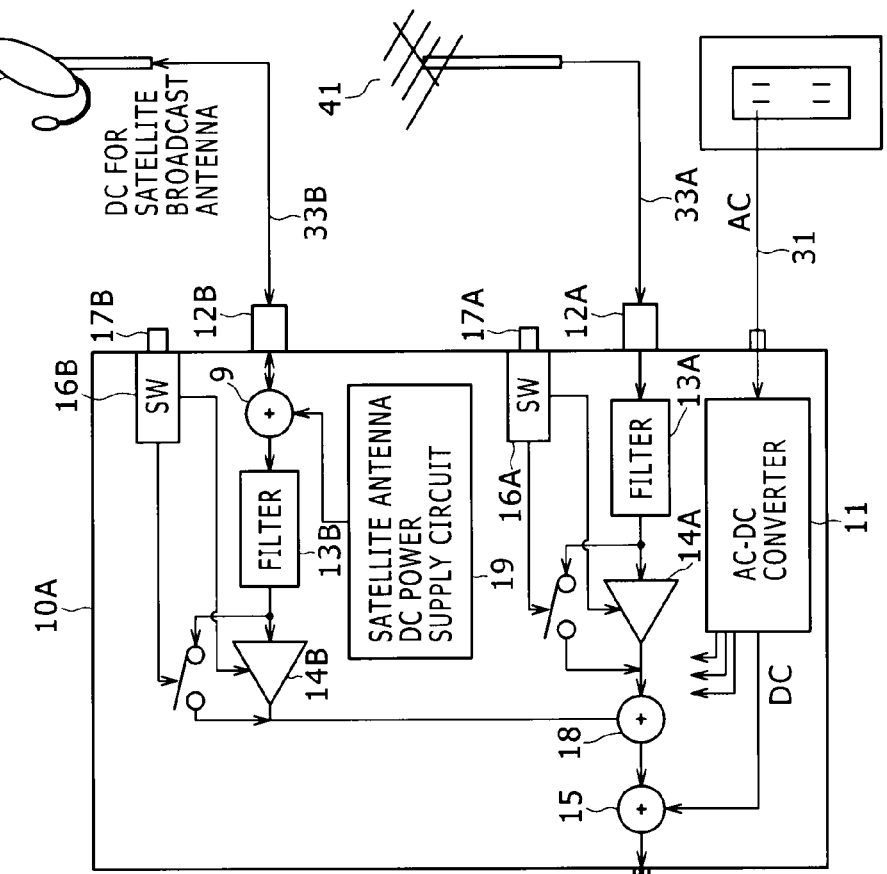
FIG. 4 illustrates the structure of a power supply system according to a second embodiment of the present invention.
Figure 4:
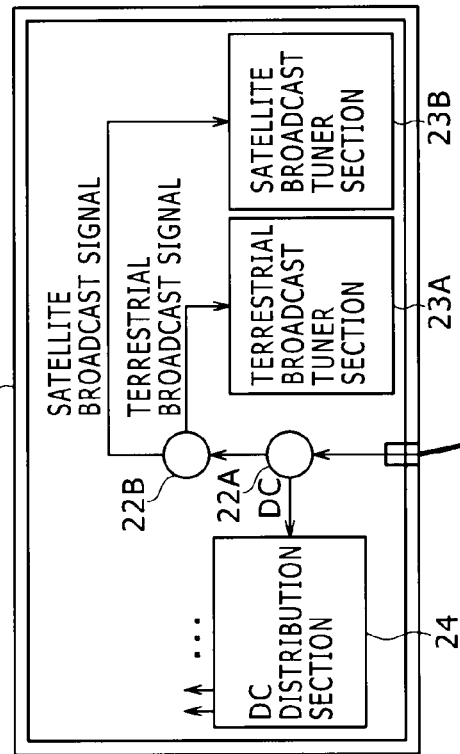

FIG. 4 illustrates the structure of the power supply system 200 according to the second embodiment of the present invention.

The power supply system 200 and a power supply adapter 10A according to this embodiment are preferable in the case where a television receiver 20A that is capable of receiving broadcast signals in accordance with a plurality of different broadcasting systems.

As shown in FIG. 4, the power supply system 200 includes the power supply adapter 10A and the television receiver 20A. The power supply adapter 10A generates, from the commercial AC power, DC power required for operation of the television receiver 20A, superimposes broadcast signals (the radio frequency (RF) signal or the intermediate frequency (IF) signal) received by a plurality of outdoor antennas 41 and 42 in conformity with the different broadcasting systems upon the generated DC power, and supplies a resultant mixture to the television receiver 20A. The television receiver 20A separates the mixture of the DC power and the broadcast signals as supplied from the power supply adapter 10A into the DC power and the individual broadcast signals in accordance with the different broadcasting systems for use thereof.

The structure of the power supply adapter 10A will now be described below.

In this embodiment, it is assumed that the broadcast signals in accordance with the different broadcasting systems that are superimposed upon the DC power within the power supply adapter 10A are the terrestrial broadcast signal and the satellite broadcast signal.

The power supply adapter 10A includes the AC power supply cable 31, the AC-DC converter circuit 11, a terrestrial broadcast coaxial cable connector 12A, a terrestrial broadcast input filter 13A, a terrestrial broadcast amplification circuit 14A, a terrestrial broadcast switch circuit 16A, a terrestrial broadcast switch operation section 17A, a satellite broadcast coaxial cable connector 12B, a satellite broadcast input filter 13B, a satellite broadcast amplification circuit 14B, a satellite broadcast switch circuit 16B, a satellite broadcast switch operation section 17B, a broadcast signal mixer 18, the mixer 15, a satellite antenna DC power supply circuit 19, a mixer/splitter 9, and the DC supply cable 32.

The AC power supply cable 31 has the power plug at one end thereof, and connects the commercial AC power supply to the input terminal of the AC-DC converter circuit 11 within the power supply adapter 10A via the power plug.

The AC-DC converter circuit 11 is a circuit for generating the specified DC power from the commercial AC power supplied from the commercial AC power supply connected thereto via the AC power supply cable 31. The AC-DC converter circuit 11 is similar in structure to an AC-DC converter circuit contained in a common power supply adapter. One difference is that the AC-DC converter circuit 11 outputs DC power required to drive the terrestrial broadcast amplification circuit 14A within the power supply adapter 10A, DC power required to drive the satellite broadcast amplification circuit 14B, and DC power required to drive a satellite broadcast reception antenna 42 for receiving the satellite broadcast signal, in addition to the DC power for driving the television receiver 20A. The output terminal of the AC-DC converter circuit 11 for the DC power for driving the television receiver 20A is connected to one of the two input terminals of the mixer 15.

The terrestrial broadcast coaxial cable connector 12A is a connector to which a connector provided at one end of a coaxial cable 33A is detachably connected. The other end of the coaxial cable 33A is connected to a terrestrial broadcast reception antenna 41 for receiving the terrestrial broadcast signal. An internal terminal of the terrestrial broadcast coaxial cable connector 12A is connected to an input terminal of the terrestrial broadcast input filter 13A.

The terrestrial broadcast input filter 13A is, for example, a BPF filter for removing unnecessary band components from the terrestrial broadcast signal inputted via the terrestrial broadcast coaxial cable connector 12A. An output terminal of the terrestrial broadcast input filter 13A is connected to an input terminal of the terrestrial broadcast amplification circuit 14A.

The terrestrial broadcast amplification circuit 14A is a circuit for amplifying an output from the terrestrial broadcast input filter 13A. An output terminal of the terrestrial broadcast amplification circuit 14A is connected to one of two input terminals of the broadcast signal mixer 18. For example, an amplification circuit equipped with an automatic gain control (AGC) or the like may be used as the terrestrial broadcast amplification circuit 14A in order to optimize output levels.

The terrestrial broadcast switch circuit 16A is a circuit for switching on and off the terrestrial broadcast amplification circuit 14A. A switch between on and off states of the terrestrial broadcast switch circuit 16A is achieved, for example, by a manual operation on the terrestrial broadcast switch operation section 17A, which is exposed above the exterior of a housing of the power supply adapter 10A.

The satellite broadcast coaxial cable connector 12B is a connector to which a connector provided at one end of a coaxial cable 33B is detachably connected. The other end of the coaxial cable 33B is connected to the satellite broadcast reception antenna 42 for receiving the satellite broadcast signal. An internal terminal of the satellite broadcast coaxial cable connector 12B is connected to an input terminal of the mixer/splitter 9.

The mixer/splitter 9 is a circuit for supplying the DC power supplied from the satellite antenna DC power supply circuit 19 to the satellite broadcast reception antenna 42 via the satellite broadcast coaxial cable connector 12B and the coaxial cable 33B, and also separating, from the DC power, the satellite broadcast signal inputted thereto from the satellite broadcast reception antenna 42 via the coaxial cable 33B and the satellite broadcast coaxial cable connector 12B and supplying the separated satellite broadcast signal to an input terminal of the satellite broadcast input filter 13B.

The satellite broadcast input filter 13B is, for example, a BPF filter for removing unnecessary band components from the satellite broadcast signal inputted via the mixer/splitter 9. An output terminal of the satellite broadcast input filter 13B is connected to an input terminal of the satellite broadcast amplification circuit 14B.

The satellite broadcast amplification circuit 14B is a circuit for amplifying an output from the satellite broadcast input filter 13B. An output terminal of the satellite broadcast amplification circuit 14B is connected to one of the two input terminals of the broadcast signal mixer 18, the other one of the two input terminals of the broadcast signal mixer 18 being the input terminal to which the output terminal of the terrestrial broadcast amplification circuit 14A is connected. For example, an amplification circuit equipped with an automatic gain control (AGC) or the like may be used as the satellite broadcast amplification circuit 14B in order to optimize output levels.

The satellite broadcast switch circuit 16B is a circuit for switching on and off the satellite broadcast amplification circuit 14B. A switch between on and off states of the satellite broadcast switch circuit 16B is achieved, for example, by a manual operation on the satellite broadcast switch operation section 17B, which is exposed above the exterior of the housing of the power supply adapter 10A.

The broadcast signal mixer 18 mixes the terrestrial broadcast signal and the satellite broadcast signal inputted thereto via the two input terminals thereof to output a resulting mixed broadcast signal. An output terminal of the broadcast signal mixer 18 is connected to one of the two input terminals of the mixer 15.

The mixer 15 is a circuit for superimposing the mixed broadcast signal, i.e., the mixture of the terrestrial broadcast signal and the satellite broadcast signal, outputted from the broadcast signal mixer 18 upon the DC power outputted from the AC-DC converter circuit 11. The output terminal of the mixer 15 is connected to one end of the DC supply cable 32, which is used to supply the DC power to the television receiver 20A.

The DC supply cable 32 is a cable for supplying, to the television receiver 20A, the DC power upon which the mixed broadcast signal, i.e., the mixture of the terrestrial broadcast signal and the satellite broadcast signal, is superimposed. A shielded wire in which a power supply wire is shielded, a coaxial wire, or the like is used for the DC supply cable 32, so as to reduce influence of external noise and prevent the broadcast signals superimposed upon the DC power from causing unwanted field emission toward the outside.

The structure of a splitting section in the television receiver 20A will now be described below.

The television receiver 20A includes the DC inlet 21, a DC/broadcast signal splitter 22A, and a broadcast signal splitter 22B.

The DC inlet 21 is a part to which the connector of the DC supply cable 32 of the power supply adapter 10A is detachably connected. The DC inlet 21 is similar to a DC inlet provided in a common television receiver. The DC inlet 21 is connected to an input terminal of the DC/broadcast signal splitter 22A.

The DC/broadcast signal splitter 22A separates the DC power and the mixed broadcast signal from the DC power upon which the mixed broadcast signal, i.e., the mixture of the terrestrial broadcast signal and the satellite broadcast signal, is superimposed. The DC power separated by the DC/broadcast signal splitter 22A is supplied via the DC distribution section 24 to various modules within the television receiver 20A, such as a circuit and a display, which operate on the DC power. The mixed broadcast signal separated by the DC/broadcast signal splitter 22A is supplied to the broadcast signal splitter 22B.

The broadcast signal splitter 22B separates the terrestrial broadcast signal and the satellite broadcast signal from the mixed broadcast signal separated by the DC/broadcast signal splitter 22A, and supplies the terrestrial broadcast signal and the satellite broadcast signal to a terrestrial broadcast tuner section 23A and a satellite broadcast tuner section 23B, respectively, within the television receiver 20A.

The operation of the power supply system 200 will now be described below.

It is assumed here that the power supply adapter 10A is connected to the commercial AC power supply via the AC power supply cable 31 and is also connected to the television receiver 20A via the DC supply cable 32. In addition, it is assumed here that the coaxial cable 33A extending from the terrestrial broadcast reception antenna 41 is connected to the terrestrial broadcast coaxial cable connector 12A of the power supply adapter 10A, and that the coaxial cable 33B extending from the satellite broadcast reception antenna 42 is connected to the satellite broadcast coaxial cable connector 12B.

In the power supply adapter 10A in the above situation, the AC-DC converter circuit 11 generates the specified DC power from the commercial AC power supplied via the AC power supply cable 31. At this time, the AC-DC converter circuit 11 generates the DC power for driving the television receiver 20A and applies the generated DC power to one of the two input terminals of the mixer 15, and also generates the DC power for driving the terrestrial broadcast amplification circuit 14A and the satellite broadcast amplification circuit 14B and applies the generated DC power to power input terminals of the terrestrial broadcast amplification circuit 14A and the satellite broadcast amplification circuit 14B. Further, the AC-DC converter circuit 11 generates the DC power required to drive the satellite broadcast reception antenna 42, and applies the generated DC power to the satellite antenna DC power supply circuit 19.

The satellite antenna DC power supply circuit 19 supplies the DC power supplied from the AC-DC converter circuit 11 to the satellite broadcast reception antenna 42 via the mixer/splitter 9, the satellite broadcast coaxial cable connector 12B, and the coaxial cable 33B. As a result, the satellite broadcast reception antenna 42 is driven to be able to receive the satellite broadcast signal. The satellite broadcast signal received by the satellite broadcast reception antenna 42 is inputted to the coaxial cable 33B, then to the satellite broadcast coaxial cable connector 12B, and then to the mixer/splitter 9. The satellite broadcast signal is separated from the DC power in the mixer/splitter 9, and then inputted to the satellite broadcast input filter 13B, and in the satellite broadcast input filter 13B, the unnecessary band components are removed from the satellite broadcast signal. After passing through the satellite broadcast input filter 13B, the satellite broadcast signal is amplified by the satellite broadcast amplification circuit 14B, and then inputted to one of the two input terminals of the broadcast signal mixer 18.

Meanwhile, the terrestrial broadcast signal received by the terrestrial broadcast reception antenna 41 is inputted to the power supply adapter 10A via the terrestrial broadcast coaxial cable connector 12A. The unnecessary band components are removed from the inputted terrestrial broadcast signal in the terrestrial broadcast input filter 13A, and the resulting terrestrial broadcast signal is inputted to the terrestrial broadcast amplification circuit 14A and amplified therein. The resulting terrestrial broadcast signal is applied to one of the two input terminals of the broadcast signal mixer 18, the other one of the two input terminals of the broadcast signal mixer 18 being the input terminal to which the satellite broadcast signal is applied.

The broadcast signal mixer 18 mixes the terrestrial broadcast signal and the satellite broadcast signal inputted thereto via the two input terminals thereof, and applies the resulting mixed broadcast signal to one of the two input terminals of the mixer 15, the other one of the two input terminals of the mixer 15 being the input terminal to which the DC power is applied. As a result, the DC power upon which the mixed broadcast signal, i.e., the mixture of the terrestrial broadcast signal and the satellite broadcast signal, is superimposed is obtained from the mixer 15, and the DC power upon which the mixed broadcast signal is superimposed is supplied to the television receiver 20A via the DC supply cable 32.

Note that the above description assumes that the operation of the terrestrial broadcast amplification circuit 14A is switched on by the terrestrial broadcast switch circuit 16A, and that the operation of the satellite broadcast amplification circuit 14B is switched on by the satellite broadcast switch circuit 16B. When reception of radio waves by the satellite broadcast reception antenna 42 or the terrestrial broadcast reception antenna 41 is poor, resulting in a reduction in quality of images displayed on the television receiver 20A, for example, the user may perform the manual operation or the like on the terrestrial broadcast switch operation section 17A or the satellite broadcast switch operation section 17B to configure the terrestrial broadcast switch circuit 16A or the satellite broadcast switch circuit 16B to switch on the operation of the terrestrial broadcast amplification circuit 14A or the satellite broadcast amplification circuit 14B. This will contribute to preventing the electric field intensity from increasing beyond the performance of the amplification circuits or the tuner, and also to preventing unnecessary power consumption.

The television receiver 20A is supplied with the DC power upon which the mixed broadcast signal, i.e., the mixture of the terrestrial broadcast signal and the satellite broadcast signal, is superimposed via the DC supply cable 32 connected to the DC inlet 21. In the television receiver 20A, the DC power and the broadcast signals are separated from each other in the DC/broadcast signal splitter 22A. The separated DC power is supplied via the DC distribution section 24 to the various modules (including the terrestrial broadcast tuner section 23A and the satellite broadcast tuner section 23B) within the television receiver 20A, such as the circuit and the display, which operate on the DC power. Meanwhile, the broadcast signals separated in the DC/broadcast signal splitter 22A is supplied to the broadcast signal splitter 22B, and separated into the terrestrial broadcast signal and the satellite broadcast signal. The terrestrial broadcast signal is supplied to the terrestrial broadcast tuner section 23A, and the satellite broadcast signal is supplied to the satellite broadcast tuner section 23B.

Each of the terrestrial broadcast tuner section 23A and the satellite broadcast tuner section 23B performs processes such as detection and demodulation of a broadcast signal corresponding to a channel selected by the user, and outputs a resultant signal to a signal processing circuit (not shown) in a subsequent stage. The signal processing circuit in the subsequent stage subjects the signal to processes such as the separation of video and audio, the decoding, the D/A conversion, and/or the like, so that the video is displayed by the display and the audio is outputted via a loudspeaker.

As described above, in the power supply system 200 according to this embodiment, the terrestrial broadcast signal received by the terrestrial broadcast reception antenna 41 and the satellite broadcast signal received by the satellite broadcast reception antenna 42 are superimposed upon the DC power within the power supply adapter 10A, and the mixture of the terrestrial broadcast signal, the satellite broadcast signal, and the DC power is supplied to the television receiver 20A using the single DC supply cable 32. This eliminates the need to provide the television receiver 20A with external antenna terminals for the terrestrial broadcast and the satellite broadcast, resulting in a reduction in product design constraints. Moreover, in the case of television receivers in related art, the power supply cable and several antenna coaxial cables are connected to the television receiver 20A, which is likely to result in complicated appearance of surroundings of the television receiver. In contrast, in the case of the power supply system 200 according to this embodiment, only the power supply cable (i.e., the DC supply cable 32) needs to be connected to the television receiver 20A, eliminating the complicated appearance.

Further, in the power supply system 200 according to this embodiment, the DC power for driving the satellite broadcast reception antenna 42 is generated within the power supply adapter 10A, and the generated DC power is supplied by the satellite antenna DC power supply circuit 19 to the satellite broadcast reception antenna 42 via the mixer/splitter 9, the satellite broadcast coaxial cable connector 12B, and the coaxial cable 33B. This eliminates the need to provide a path for supplying the DC power from the television receiver 20A to the satellite broadcast reception antenna 42, resulting in a further reduction in the connection sections in the television receiver 20A.

Note that the broadcast signals that are superimposed upon the DC power and supplied to the television receiver 20A are not limited to the terrestrial broadcast signal and the satellite broadcast signal. The terrestrial digital radio broadcast signal and the CATV digital broadcast signal may also be superimposed upon the DC power and supplied to the television receiver 20A, for example.

The broadcast receiver may be any device containing a tuner. For example, a radio receiver, a recorder/player containing a tuner, a PC having a tuner function installed therein, as well as the television receiver, fall within the scope of the broadcast receiver to which the present invention is applicable.

Note that the present invention is not limited to the above-described embodiments. It should be understood by those skilled in the art that various modifications, combinations, sub-combinations and alterations may occur depending on design requirements and other factors insofar as they are within the scope of the appended claims or the equivalents thereof.

What is claimed is:

1. A power supply adapter for supplying Direct Current power to a broadcast receiver that processes a broadcast signal, the power supply adapter comprising:
   a converter configured to generate the Direct Current power from Alternating Current power;
   a broadcast signal reception section configured to receive the broadcast signal;
   a mixer configured to mix the broadcast signal received by said broadcast signal reception section with an output from said converter; and
   a supply section configured to supply an output from said mixer to the broadcast receiver.

2. The power supply adapter according to claim 1, further comprising:
   an amplification circuit configured to amplify the broadcast signal received by said broadcast signal reception section, wherein
   said mixer mixes an output from said amplification circuit with the output from said converter.

3. The power supply adapter according to claim 1, wherein, said broadcast signal reception section is configured to receive broadcast signals in accordance with a plurality of different broadcasting systems, and
   said mixer mixes the broadcast signals in accordance with the plurality of broadcasting systems as received by said broadcast signal reception section with the output from said converter.

4. The power supply adapter according to claim 1, wherein, said broadcast signal reception section receives the broadcast signal from an external antenna via a cable, and
   the power supply adapter further comprises an antenna DC power supply section configured to supply DC power for driving the antenna to the antenna via the cable, the cable being placed between and connecting said broadcast signal reception section and the antenna.

5. A power supply system, comprising:
   a broadcast receiver configured to process a broadcast signal; and
   a power supply adapter configured to supply DC power to said broadcast receiver,
   wherein said power supply adapter includes
   a converter configured to generate the DC power from AC power,
   a broadcast signal reception section configured to receive the broadcast signal, a mixer configured to mix the broadcast signal received by the broadcast signal reception section with an output from the converter, and a supply section configured to supply an output from the mixer to said broadcast receiver, and said broadcast receiver includes a splitting section configured to separate the DC power and the broadcast signal from an output from said power supply adapter.

* * * * *